United States Patent
Yeh

(10) Patent No.: US 8,099,145 B2
(45) Date of Patent: Jan. 17, 2012

(54) ELECTRONIC DEVICE

(75) Inventor: Chih-Shan Yeh, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 612 days.

(21) Appl. No.: 12/193,877

(22) Filed: Aug. 19, 2008

(65) Prior Publication Data

US 2009/0103253 A1    Apr. 23, 2009

(30) Foreign Application Priority Data

Oct. 17, 2007 (TW) ................................ 96138819 A

(51) Int. Cl.
*H04M 1/00* (2006.01)
*H04M 9/00* (2006.01)
(52) U.S. Cl. ............ 455/575.4; 455/575.1; 379/433.12; 379/433.11; 379/433.01
(58) Field of Classification Search ............... 455/575.4, 455/575.1; 379/433.01, 433.11, 433.12
See application file for complete search history.

(56) References Cited

U.S. PATENT DOCUMENTS

| | | | |
|---|---|---|---|
| 2006/0166531 A1* | 7/2006 | Tsai | 439/159 |
| 2007/0155451 A1* | 7/2007 | Lee | 455/575.4 |
| 2008/0064455 A1* | 3/2008 | Joo et al. | 455/575.4 |
| 2008/0084994 A1* | 4/2008 | Chuang | 379/433.11 |
| 2009/0038228 A1* | 2/2009 | Lee | 49/360 |

\* cited by examiner

*Primary Examiner* — Marivelisse Santiago Cordero
*Assistant Examiner* — Mong-Thuy Tran
(74) *Attorney, Agent, or Firm* — Birch, Stewart, Kolasch & Birch, LLP

(57) ABSTRACT

An electronic device includes a first module, a second module, and a connecting member. The first module includes a bottom plate having a first slot and a rail corresponding to the first slot. The second module includes a top plate having a second slot and a slide bar overlapping a portion of the second slot. The connecting member passes through the first slot and the second slot and connects the rail and the slide bar. When the first module slides relative to the second module from a first position to a second position in a direction, the connecting member slides along the rail, and when the first module slides relative to the second module from the second position to a third position in the direction, the connecting member forces the slide bar to slide along the second slot.

12 Claims, 11 Drawing Sheets

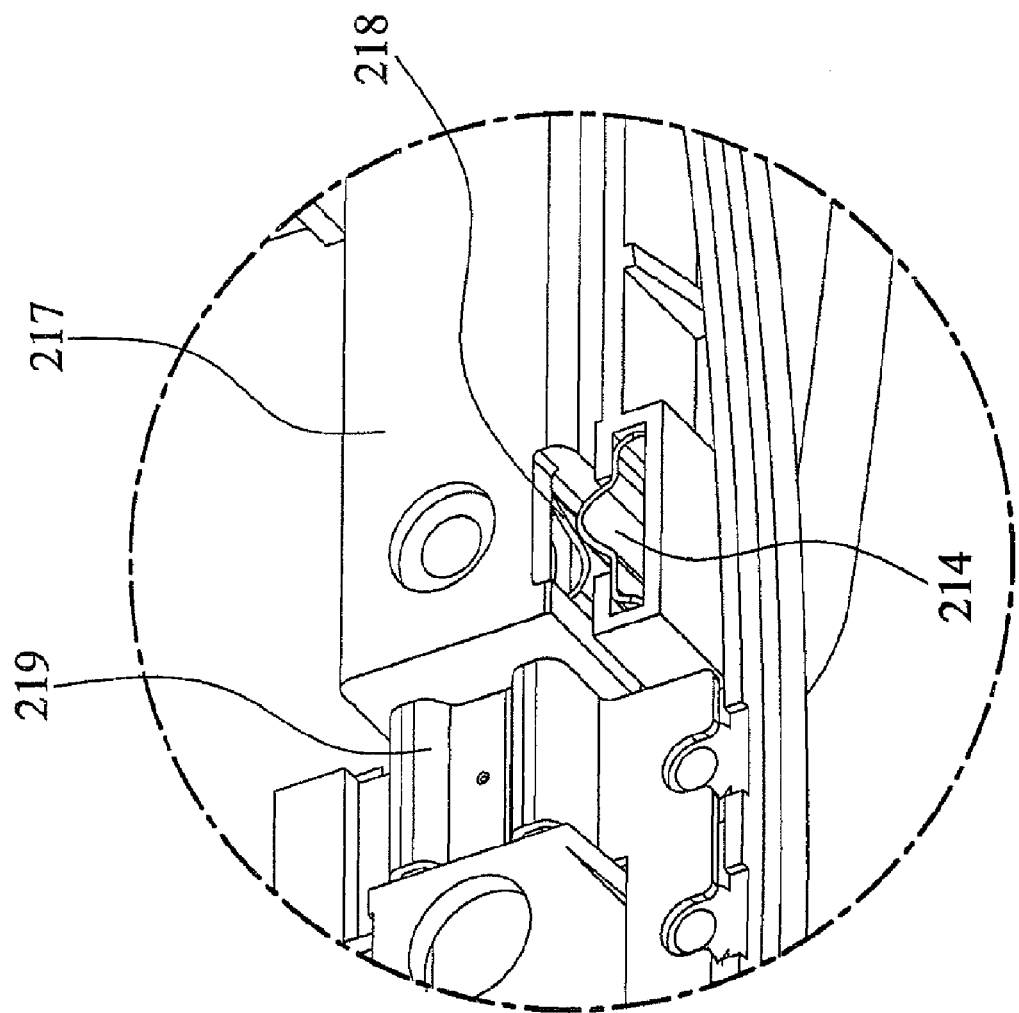

ELECTRONIC DEVICE

CROSS REFERENCE TO RELATED APPLICATIONS

This Application claims priority of Taiwan Patent Application No. 96138819, filed on Oct. 17, 2007, the entirety of which is incorporated by reference herein.

BACKGROUND OF THE INVENTION

1. Field of the Invention

The invention relates to an electronic device, and more particularly to an electronic device provided with rails, slide bars and connecting members to increase the available region of the keyboard module.

2. Description of the Related Art

A conventional sliding-type electronic device generally includes a display module, a keyboard module, and a flexible printed circuit electrically connecting the display module and the keyboard module. To open the electronic device for use, the display module is pushed and slides relative to the keyboard module from a first position to a second position, to expose keys on the keyboard module. To close the electronic device for storage and transportation, the display module is pushed and slides relative to the keyboard module from the second position back to the first position, to cover the keyboard module.

For the conventional electronic device, however, the movement of the display module relative to the keyboard module from the first position to the second position is limited due to the hinge design. After the electronic device is opened, the display module overlaps a portion of the keyboard module. Thus, the available area of the keyboard module is reduced and the design of the electronic device is restricted.

BRIEF SUMMARY OF THE INVENTION

The invention provides an electronic device comprising a first module, a second module, and a connecting member. The first module comprises a bottom plate and a rail, wherein the bottom plate has a first slot and the rail is corresponding to the first slot. The second module comprises a top plate and a slide bar, wherein the top plate has a second slot and the slide bar overlaps a portion of the second slot. The connecting member passes through the first slot and the second slot and connects the rail and the slide bar, wherein the bottom plate and the top plate are located between the rail and the slide bar. When the first module slides relative to the second module from a first position to a second position in a direction, the connecting member slides along the rail, and when the first module slides relative to the second module from the second position to a third position in the direction, the connecting member forces the slide bar to slide along the second slot.

BRIEF DESCRIPTION OF THE DRAWINGS

The invention can be more fully understood by reading the subsequent detailed description and examples with references made to the accompanying drawings, wherein:

FIG. 7B is a partially enlarged view of the electronic device of FIG. 7A.

DETAILED DESCRIPTION OF THE INVENTION

Figure 1:
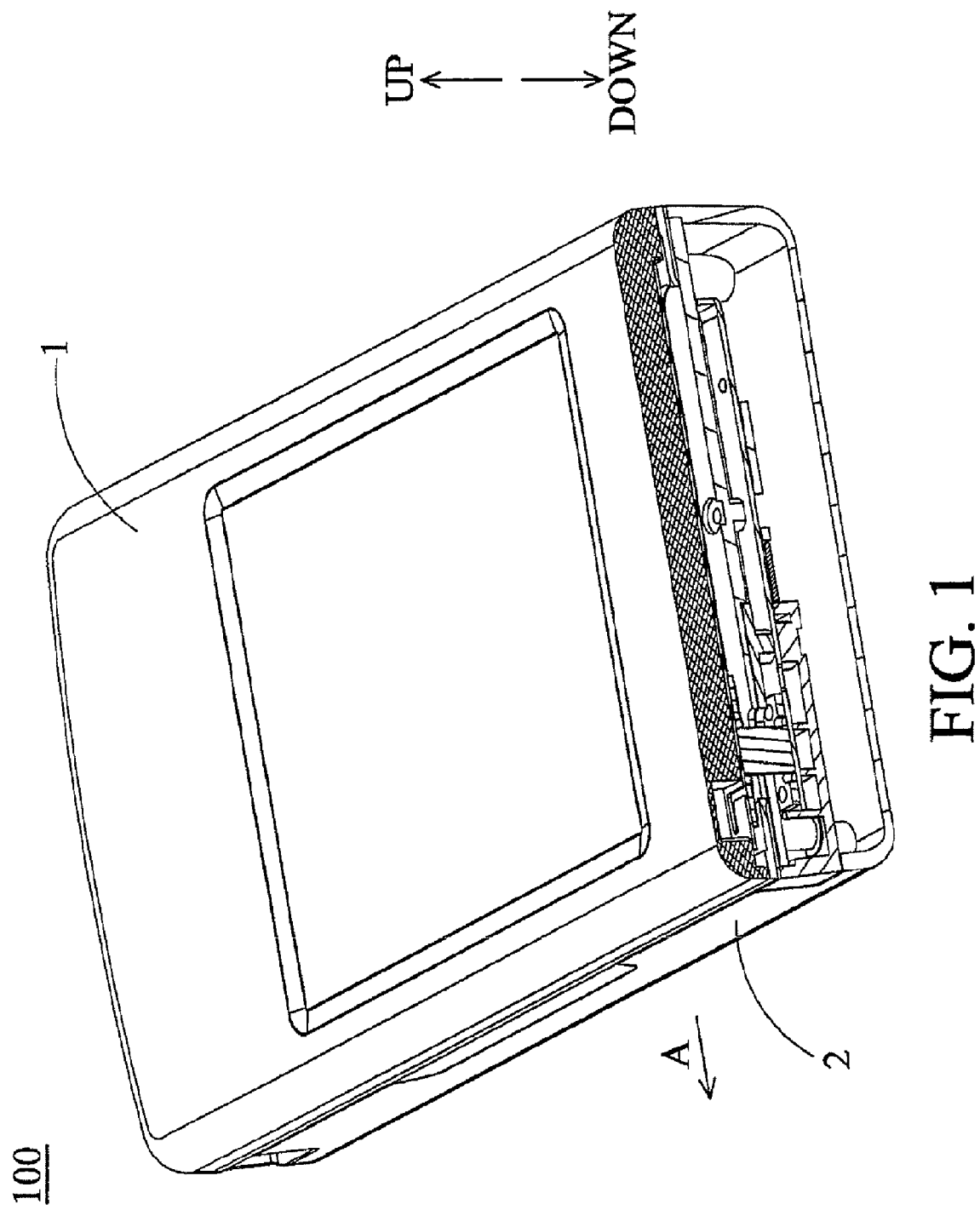
FIG. 1 is a schematic view of a display module of an electronic device in a closed position in accordance with an embodiment of the invention.

Referring to FIG. 1, an electronic device of the invention is shown. The electronic device 100 may be a mobile phone, a personal digital assistant (PDA), or other hand-held electronic devices. The electronic device 100 of the invention comprises a display module 1, a keyboard module 2 and a flexible printed circuit board (not shown), wherein the keyboard module 2 is disposed below the display module 1 and the flexible printed circuit electrically connects the display module 1 and the keyboard module 2.

Figure 2:
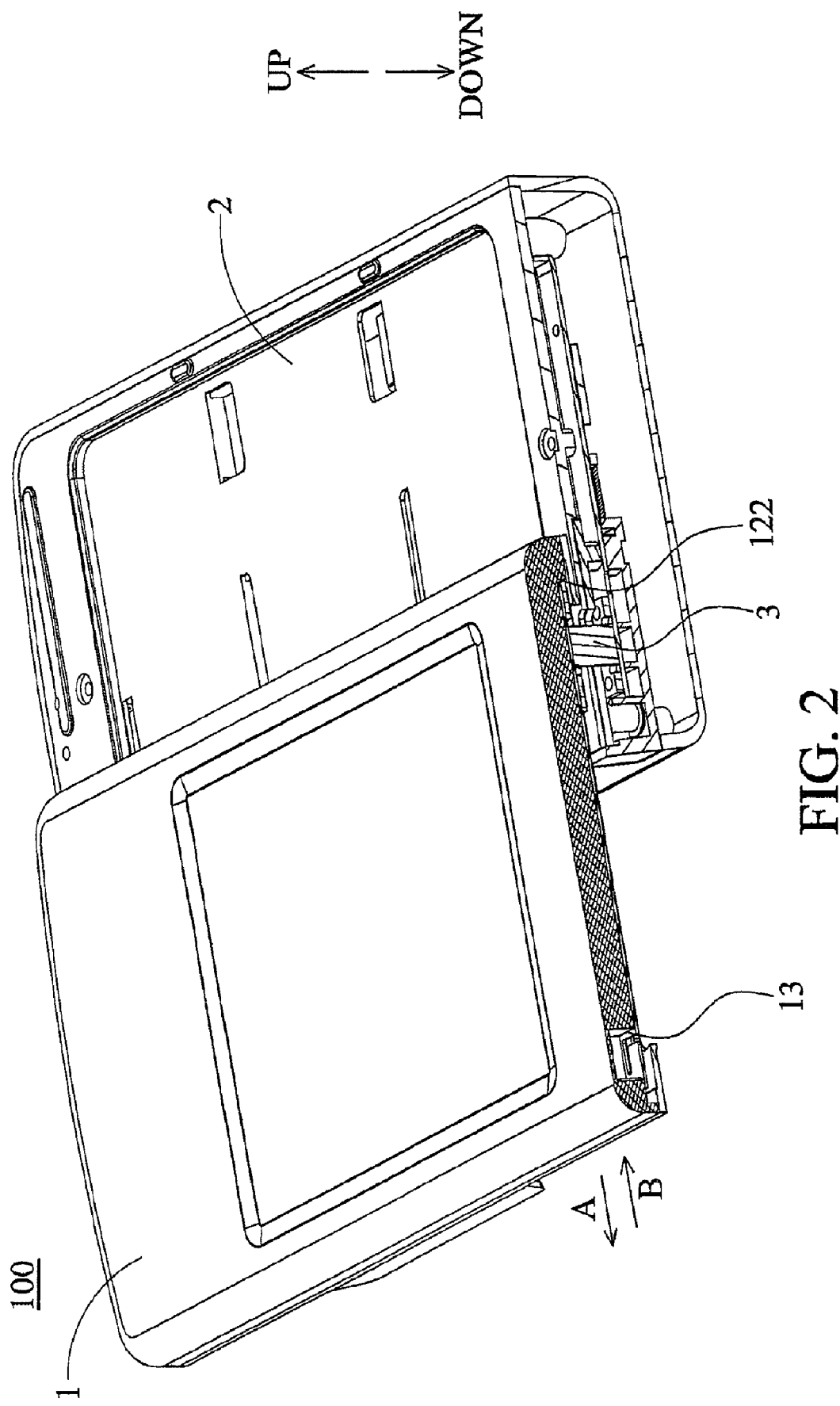
FIG. 2 is a schematic view of a display module of an electronic device in a transitional position in accordance with the embodiment of the invention.
Figure 3:
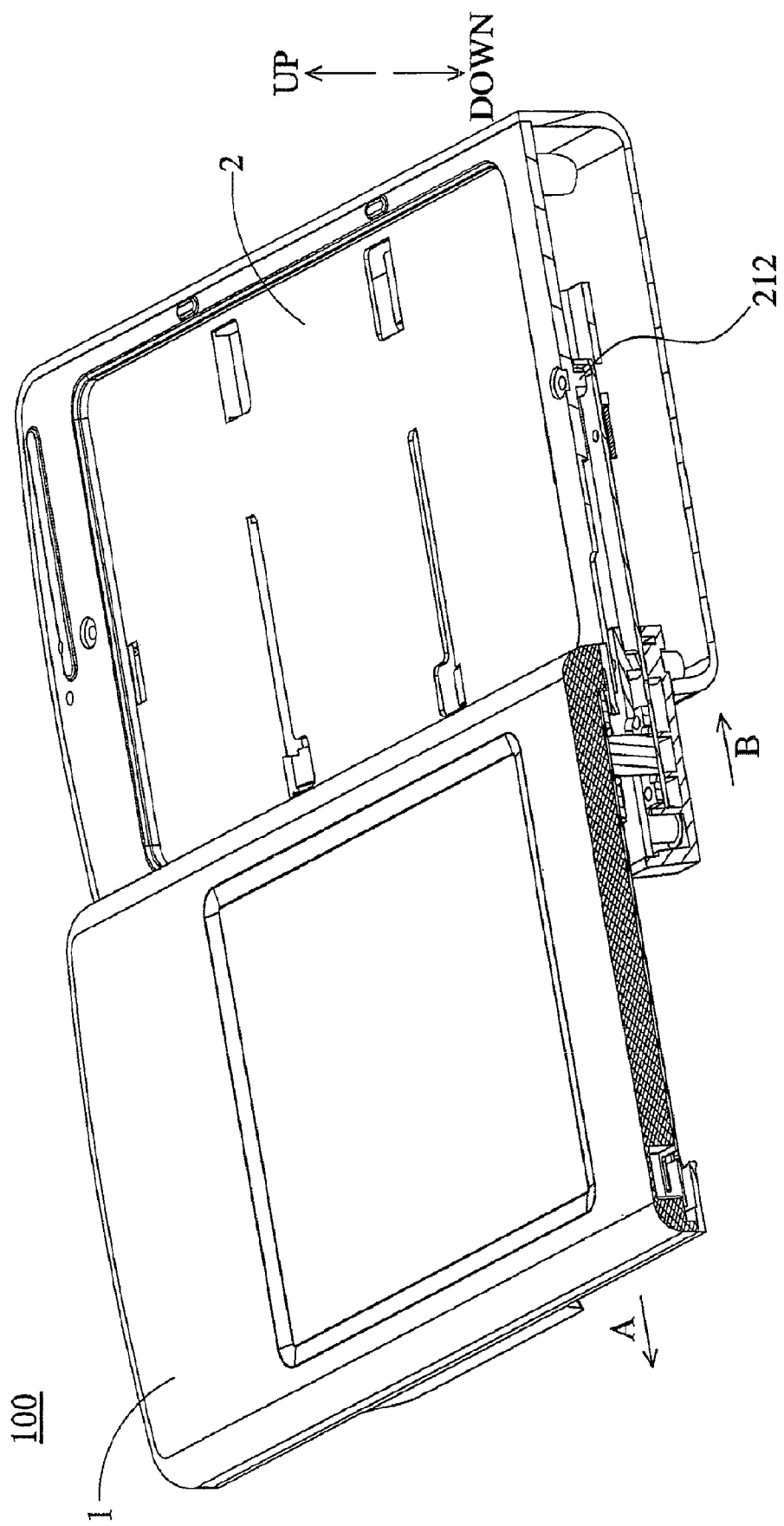
FIG. 3 is a schematic view of a display module of an electronic device in an opened position in accordance with the embodiment of the invention.

When a user wants to use the electronic device 100, the display module 1 is pushed in a direction of arrow A, so that the display module 1 is changed from a closed position (as shown in FIG. 1) through a transitional position (as shown in FIG. 2) to an opened position (as shown in FIG. 3). When the user finishes using the electronic device 100, the display module 1 is pushed in a direction of arrow B, so that the display module 1 of the electronic device 100 is returned to the closed position. In FIG. 2 and FIG. 3, the keys of the keyboard module 2 are removed to show the internal structure.

Figure 4:
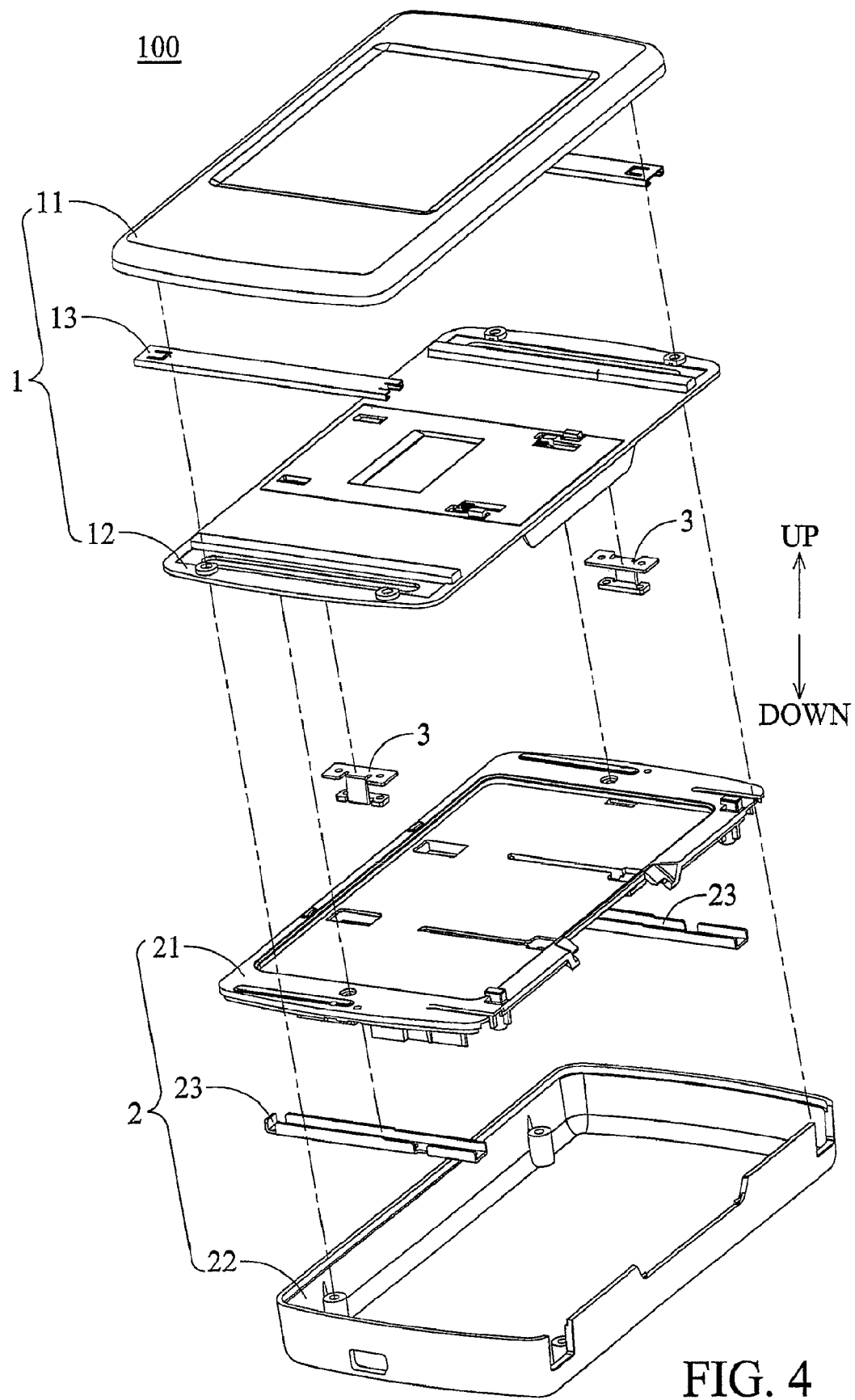
FIG. 4 is an exploded view of an electronic device in accordance with the embodiment of the invention.

Referring to FIG. 4, an exploded view of an electronic device of the invention is shown. The display module 1 comprises a top cover 11, a bottom plate 12 and two rails 13 located between the top cover 11 and the bottom plate 12. The keyboard module 2 comprises a top plate 21, a bottom cover 22 and two slid bars 23 located between the top plate 21 and the bottom cover 22, wherein the bottom plate 12 and the top plate 21 are located between the rails 13 and the slide bars 23. The electronic device 100 further comprises two connecting members connected between the rails and the slide bars.

Figure 5:
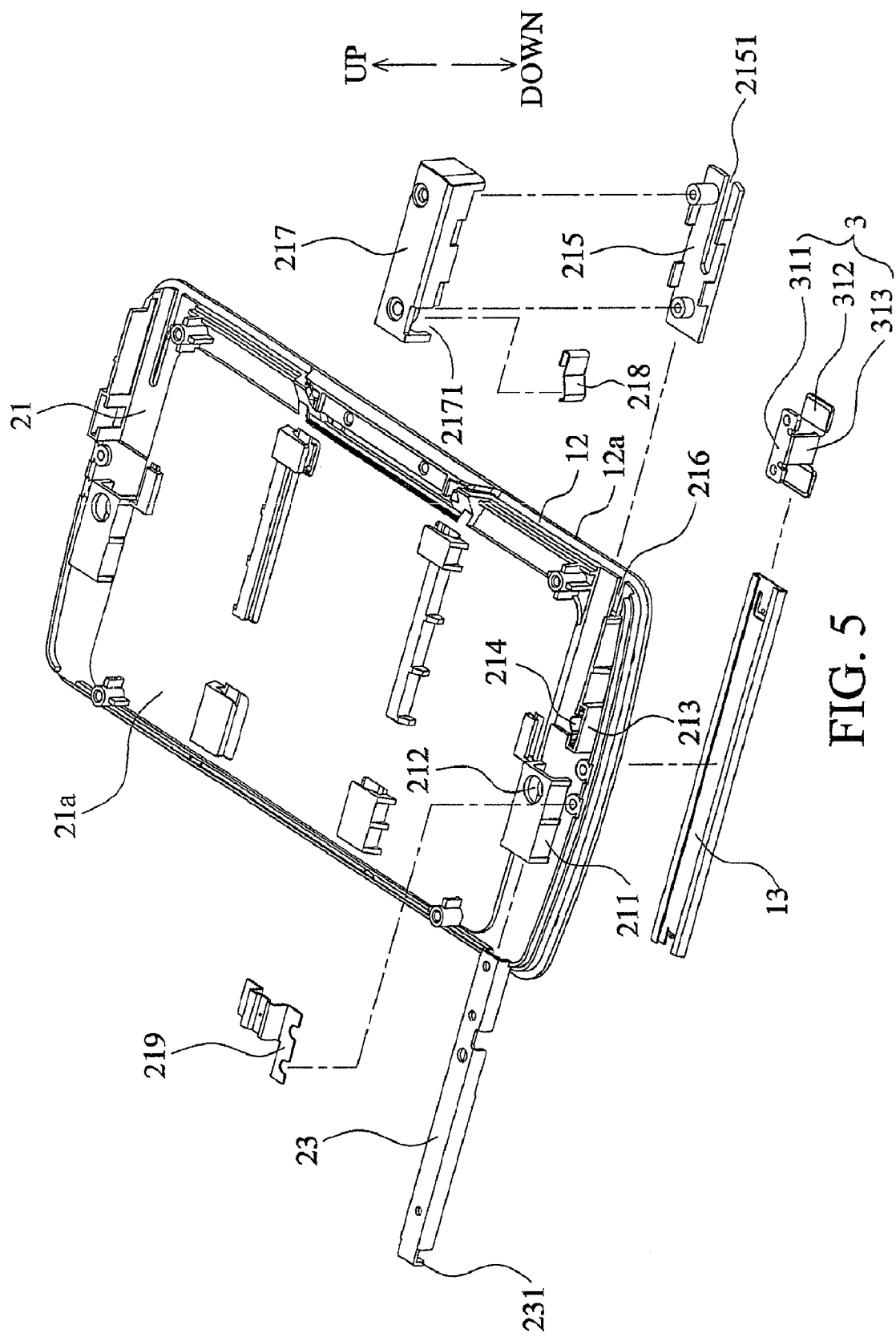
FIG. 5 is an assembly drawing of a top plate and a bottom plate in accordance with the embodiment of the invention.
Figure 7A:
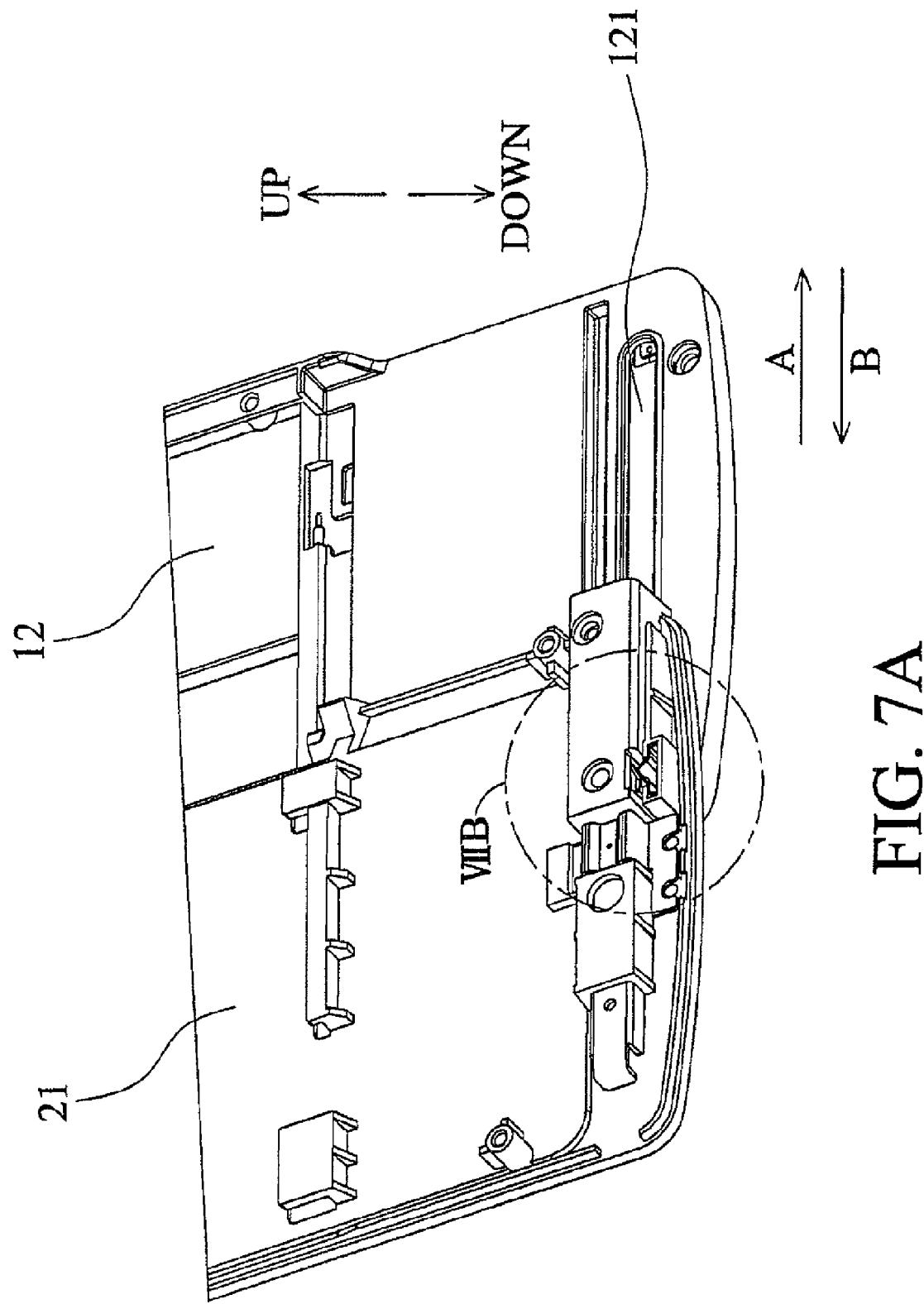

FIG. 5 depicts the electronic device of the invention turned upside down, wherein the top plate 21 and the bottom plate 12 are assembled. The bottom plate 12 has a top surface 12a, two first slots 121(as shown in FIG. 7A) and two flanges 122 (as shown in FIG. 2), and the flanges 122 are located at a side of the first slots 121. The top plate 21 has a bottom surface 21a, two sleeves 211, two stopping members 212, two fixed mounts 213, two outer elastic members 214, two top protecting covers 215, two second slots 216, two bottom protecting covers 217, two inner elastic members 218, and two guide hoods 219. The connecting member 3 comprises a connecting part 311, a sliding part 312, and an extending part 313 located between the connecting part 311 and the sliding part 312.

Referring to FIG. 4 and FIG. 5, the bottom plate 12 is located above the top plate 21, and the top protecting cover 215 has a third slot 2151 and is disposed on the bottom surface 21a of the top plate 21, wherein the third slot 2151 of the top protecting cover 215 aligns with and connects with the second slot 216 and first slot 121.

The rail 13 is disposed on the top surface 12a of the bottom plate 12 and corresponds to the first slot 121. The sliding part 312 of the connecting member 3 is slidably disposed in the rail 13 and the extending part 313 of the connecting member 3 passes through the first slot 121, the third slot 2151 and the second slot 216. The sleeve 211 is disposed on the bottom surface 21a of the top plate 21. The stopping member 212 is disposed in the sleeve 211. The slide bar 23 has an end 231, passes through the sleeve 211, overlaps a portion of the second slot 216 and is locked below the connecting part 311 of the connecting member 3.

The fixed mount 213 is disposed next to the top protecting cover 215. The outer elastic member 214 is disposed in the fixed mount 213. The bottom protecting cover 217 having a notch 2171 is disposed below the top protecting cover 215, and covers a portion of the slide bar 23. The inner elastic member 218 is fixed in the bottom protecting cover 217 and exposed through the notch 2171, and abuts against the outer elastic member 214. The guide hood 219 is disposed between the sleeve 211 and the bottom protecting cover 217 and also covers a portion of the slide bar 23.

In this embodiment, the rails 13, the slide bars 23, the connecting members 3, the first slots 121, the flanges 122, the sleeves 211, the stopping members 212, the fixed mounts 213, the outer elastic members 214, the top protecting covers 215, the second slots 216, the bottom protecting covers 217, inner elastic members 218, and the guide hoods 219 of the electronic device 100 are in pairs, identical in shape, and correspondingly disposed on two sides of the bottom plate 12 and top plate 21, respectively.

Figure 6A:
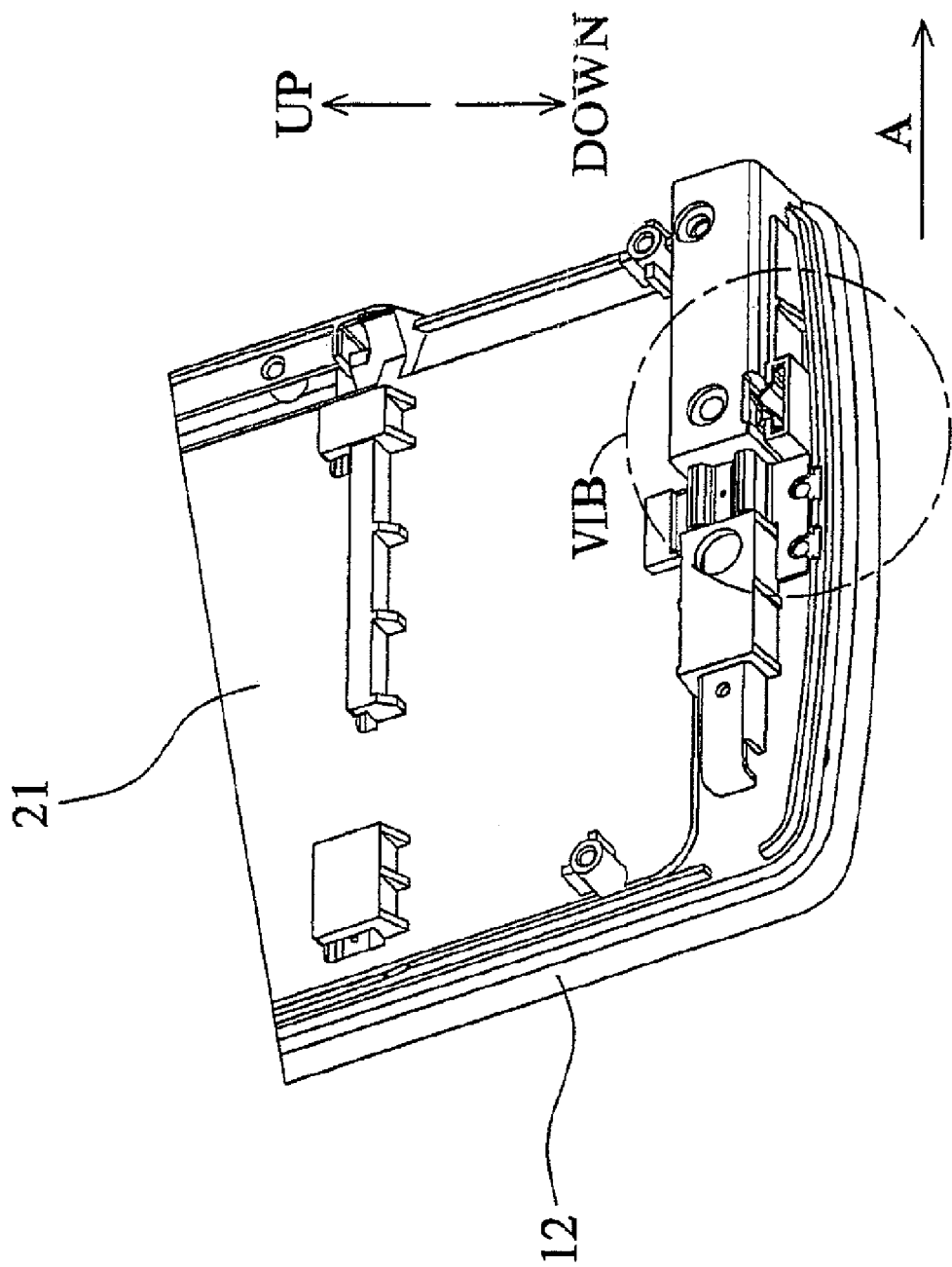
FIGS. 6A, 7A, and 8A depict an extension of an electronic device in accordance with the embodiment of the invention.
Figure 8A:
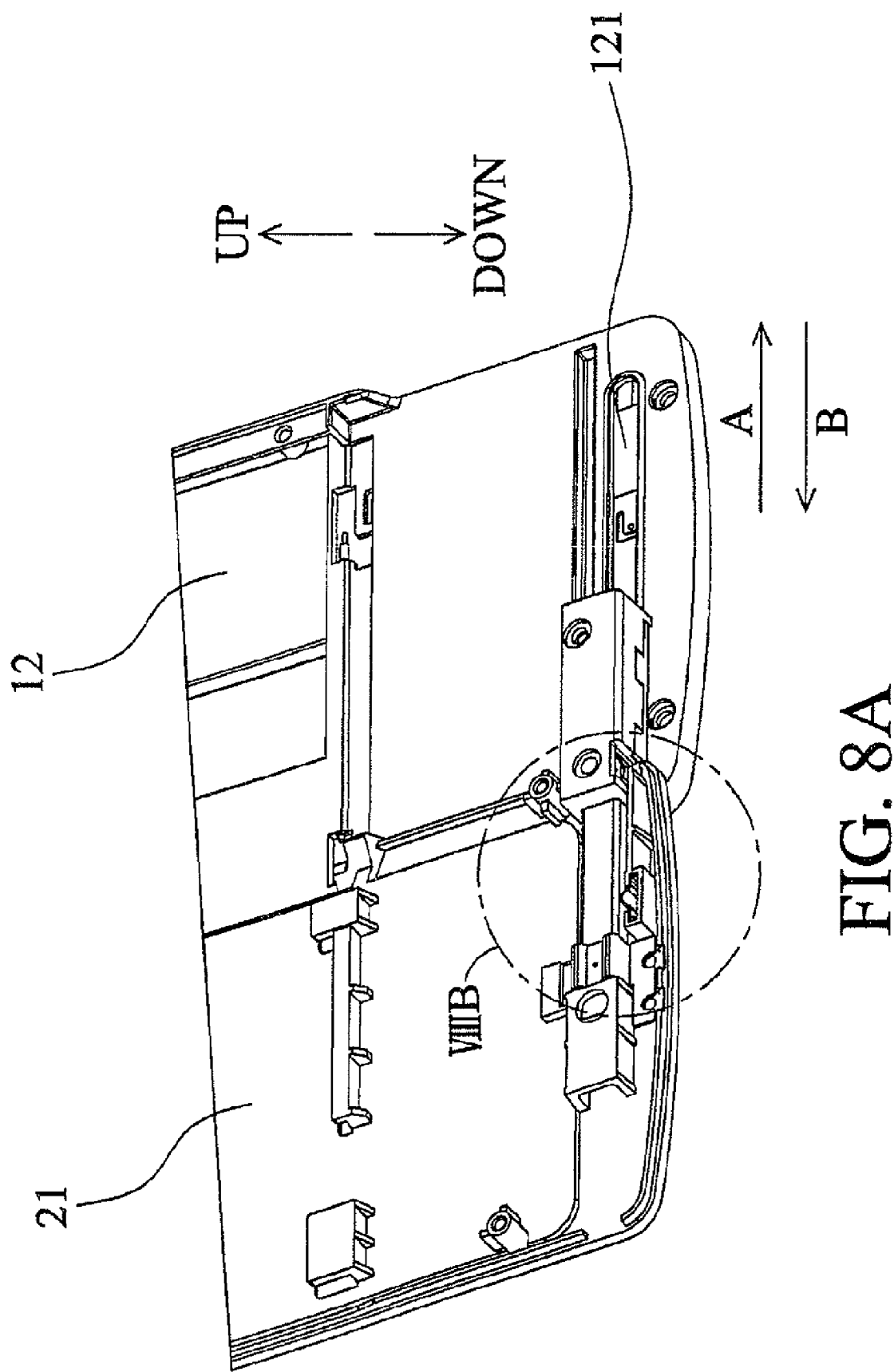

FIGS. 6A, 7A and 8A depict an operating process of the electronic device of the invention, wherein the electronic device 100 is turned upside down whereby the keyboard module 2 is disposed above the display module 1 similar to that of FIG. 5, and the top cover and the bottom cover are removed for clearly showing the internal structure. FIG. 6A to FIG. 7A depict the motion of the rail in the first stage of an operation of the electronic device 100, and FIG. 7A to FIG. 8A depict the motion of the slide bar in the second stage of an operation of the electronic device 100.

<Opening Operation of Electronic Device>

Figure 6B:
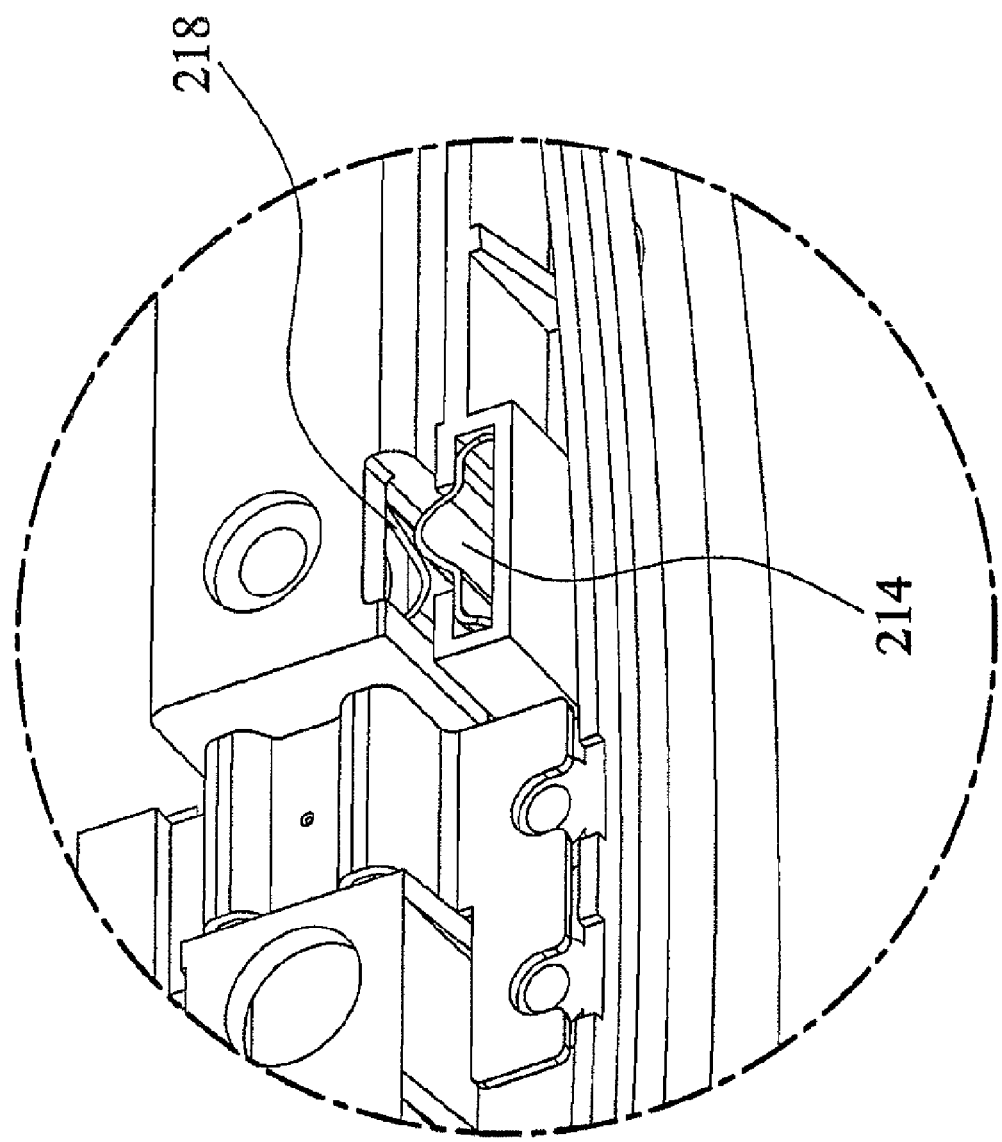
FIG. 6B is a partially enlarged view of the electronic device of FIG. 6A.

In the first stage of the opening operation, the rail is moved:

Referring to FIG. 6A, when the electronic device 100 is not used, the display module 1 is in the closed position and the inner elastic member 218 abuts against the outer elastic member 214 (as shown in FIG. 6B). To use the electronic device 100, the bottom plate 12 of the display module 1 is pushed in the direction of arrow A (as shown in FIG. 6A). Thus, the rail 13 slides relative to the connecting member 3 until an end of the sliding part 312 of the connecting member 3 abuts against the flange 122 to stop the bottom plate of the display module 1 (as shown in FIG. 2). At this time, the display module 1 is in the transitional position (as shown in FIG. 7A) and the inner elastic member 218 abuts against the outer elastic member 214 (as shown in FIG. 7B).

Figure 8B:
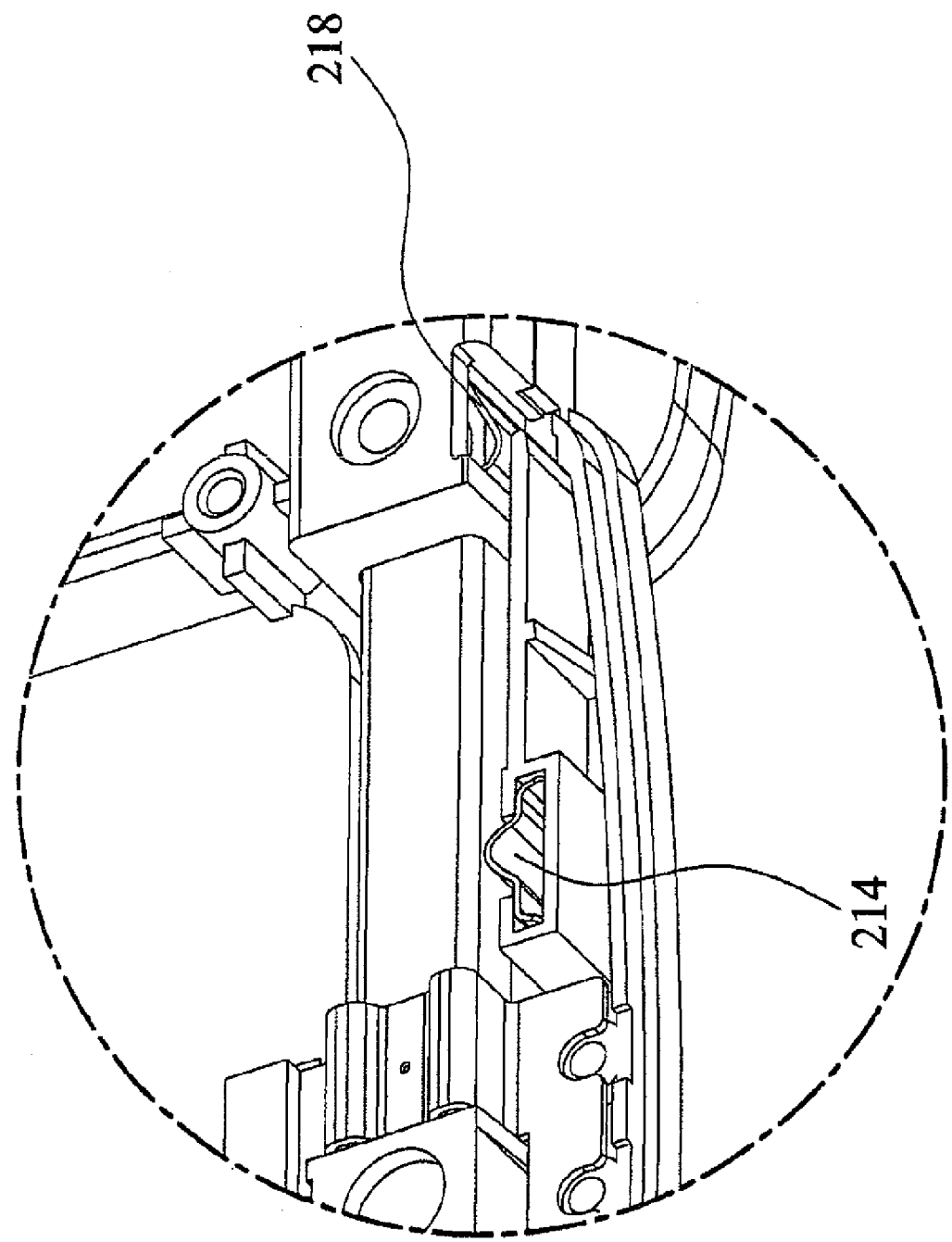
FIG. 8B is a partially enlarged view of the electronic device of FIG. 8A.

In the second stage of the opening operation, the slide bar is moved:

When the bottom plate 12 of the display module 1 is continuously pushed in the direction of arrow A (as shown in FIG. 7A), the inner elastic member 218 and the outer elastic member 214 are separated by a thrust (as shown in FIG. 8B), and the top protecting cover 215, the bottom protecting cover 217, inner elastic member 218, and the connecting member 3 simultaneously slide relative to the second slot 216 in the direction of arrow A, and then the connecting member 3 forces the slide bar 23 to slide along the second slot 216 until the end 231 of the slide bar 23 abuts against the stopping member 212 to stop the bottom plate 12 of the display module 1 (as shown in FIG. 3). At this time, the display module 1 is in the opened position (as shown in FIG. 8A) and the keys on the keyboard module 2 are totally exposed.

<Closing Operation of Electronic Device>

In the first stage of the closing operation, the slide bar is moved:

To return the display module 1 of the electronic device 100 to the closed position, the bottom plate 12 of the display module 1 is pushed in the direction of arrow B (as shown in FIG. 8), and the top protecting cover 215, the bottom protecting cover 217, inner elastic member 218, and the connecting member 3 simultaneously slide relative to the second slot 216 in the direction of arrow B, and then the connecting member 3 forces the slide bar 23 to slide along the second slot 216. When the inner elastic member 218 abuts against the outer elastic member 214 and the bottom protecting cover 217 abuts against the guide hood 219 (as shown in FIG. 7B), the bottom plate 12 of the display module 1 stops moving (as shown in FIG. 2) and the bottom plate 12 of the display module 1 returns back to the transitional position (as shown in FIG. 7A).

In the second stage of the closing operation, the rail is moved:

When the bottom plate 12 of the display module 1 is continuously pushed in the direction of arrow B (as shown in FIG. 7A), the rail 13 slides relative to the connecting member 3, and then the bottom plate 12 of the display module 1 returns back to the original closed position (as shown in FIG. 6A).

In this embodiment of the invention, the connecting member 3 is disposed in the keyboard module 2. The keyboard module 2 can be designated as the second module, and the display module 1 can be designated as the first module. However, the relationship between each member can be changed. That is to say, in another embodiment, the connecting member 3 is disposed in the display module 1, namely the first module.

From the above description, the electronic device of the invention is assembled through rails, slide bars, and connecting members, through which the opening/closing operation of the electronic device are executed in two stages—the motions of the rail and the slide bar. Thus, the display module can be totally opened to expose the keys on the keyboard module and increase the available area of the electronic device.

While the invention has been described by way of example and in terms of preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device comprising:
 a first module, comprising a bottom plate and a rail, wherein the bottom plate has a first slot and the rail is corresponding to the first slot;
 a second module, comprising a top plate and a slide bar, wherein the top plate comprises:
  a second slot;
  a top protecting cover having a third slot aligning with and connecting with the second slot and the first slot;
  a bottom protecting cover disposed below the top protecting cover, covering a portion of the slide bar;
  an outer elastic member fixed on the top plate; and an inner elastic member fixed in the bottom protecting cover; and a connecting member, passing through the first slot and the second slot and connecting the rail and the slide bar, wherein the bottom plate and the top plate are located between the rail and the slide bar, wherein when the first module slides relative to the second module from a first position to a second position in a direction, the connecting member slides along the rail, and the outer elastic member abuts against the inner elastic member, wherein when the first module slides relative to the second module from the second position to the third position in the direction, the connecting member forces the slide bar to slide along the second slot, and the top protecting cover, the bottom protecting cover and the inner elastic member slide relative to the second slot, and the outer elastic member and the inner elastic member are separated.

2. The electronic device as claimed in claim 1, wherein the first module is a display module and the second module is a keyboard module.

3. The electronic device as claimed in claim 1, wherein the first module is a keyboard module and the second module is a display module.

4. The electronic device as claimed in claim 1, wherein the connecting member comprises a connecting part fixed on the slide bar, a sliding part slidably disposed in the rail, and an extending part located between the connecting part and the sliding part.

5. The electronic device as claimed in claim 4, wherein the bottom plate further has a flange and when the first module slides relative to the second module from the first position to the second position, the sliding part abuts against the flange.

6. The electronic device as claimed in claim 1, wherein the connecting member passes through the third slot.

7. The electronic device as claimed in claim 1, wherein the top plate further has a fixed mount, and the outer elastic member is disposed in the fixed mount.

8. The electronic device as claimed in claim 1, wherein the bottom protecting cover has a notch, and the inner elastic member is exposed through the notch.

9. The electronic device as claimed in claim 1, wherein the top plate further has a sleeve and a stopping member disposed in the sleeve, and the slide bar having an end passes through the sleeve, and when the first module slides relative to the second module from the second position to the third position, the end abuts against the stopping member and the first module stops.

10. The electronic device as claimed in claim 9, wherein the top plate further has a guide hood disposed next to the sleeve and covering a portion of the slide bar.

11. The electronic device as claimed in claim 1, wherein the first module further comprises a top cover located above the bottom plate.

12. The electronic device as claimed in claim 1, wherein the second module further comprises a bottom cover located below the top plate.

\* \* \* \* \*